(12) United States Patent
Ferranti et al.

(10) Patent No.: US 12,714,066 B2
(45) Date of Patent: Aug. 25, 2026

(54) FEEDING SYSTEM AND METHOD FOR FEEDING ANIMALS

(71) Applicant: Lely Patent N.V., Maassluis (NL)

(72) Inventors: Vincenzo Ferranti, Rotterdam (NL); Lois Hofland, Rotterdam (NL); Johannes Jacobs, Maardingen (NL); Tom Adrianus Josephus Van De Ven, Udenhout (NL); Stefan Johannes Francisca Maria Verbruggen, Schiedam (NL)

(73) Assignee: Lely Patent N.V., Maassluis (NL)

( * ) Notice: Subject to any disclaimer, the term of this patent is extended or adjusted under 35 U.S.C. 154(b) by 379 days.

(21) Appl. No.: 17/784,937

(22) PCT Filed: Dec. 15, 2020

(86) PCT No.: PCT/NL2020/050793
§ 371 (c)(1),
(2) Date: Jun. 13, 2022

(87) PCT Pub. No.: WO2021/125949
PCT Pub. Date: Jun. 24, 2021

(65) Prior Publication Data

US 2023/0033258 A1 Feb. 2, 2023

(30) Foreign Application Priority Data

Dec. 19, 2019 (NL) ..................................... 2024508

(51) Int. Cl.
*A01K 5/02* (2006.01)

(52) U.S. Cl.
CPC .................................. *A01K 5/0275* (2013.01)

(58) Field of Classification Search
CPC ........................................................ A01K 5/02
See application file for complete search history.

(56) References Cited

U.S. PATENT DOCUMENTS

2010/0326363 A1 12/2010 Van Den Berg
2015/0034014 A1* 2/2015 Van Kuilenburg ...... A01K 1/10
(Continued)

FOREIGN PATENT DOCUMENTS

EP 2 134 161 A1 12/2009
EP 3 494 779 A1 6/2019
(Continued)

OTHER PUBLICATIONS

International Search Report issued May 14, 2021 in PCT/NL2020/050793, filed on Dec. 15, 2020, 4 pages.

*Primary Examiner* — Joshua J Michener
*Assistant Examiner* — Henry Hooper Mudd
(74) *Attorney, Agent, or Firm* — Oblon, McClelland, Maier & Neustadt, L.L.P.

(57) ABSTRACT

A feeding system for feeding animals, in particular cows, at a feeding place feed from a feed supply including at least one autonomous feeding device having a container for accommodating a batch of feed from the feed supply. The autonomous feeding takes feed held in the container to the feeding place and dispenses it. The feeding system further includes a feed-quantity measuring device for repeatedly measuring a feed-quantity value for the quantity of feed for consumption by the animals at the feeding place, and a control system which receives feed-quantity values from the feed-quantity measuring device measured different measurement instants. The control system stores a plurality of the feed-quantity values in a memory. The control system calculates at least one value of a feed variable at at least one point in time after the last measurement instant, on the basis of the feed-quantity values stored in the memory.

18 Claims, 4 Drawing Sheets

(56) References Cited

U.S. PATENT DOCUMENTS

| | | | | |
|---|---|---|---|---|
| 2021/0000068 | A1* | 1/2021 | Marichal | A01K 5/02 |
| 2021/0127630 | A1* | 5/2021 | Zimmerman | A01K 5/02 |
| 2022/0232764 | A1* | 7/2022 | Blokland | A01D 34/00 |
| 2022/0256815 | A1* | 8/2022 | Tsur | A01K 39/012 |

FOREIGN PATENT DOCUMENTS

| | | | |
|---|---|---|---|
| WO | WO 2008/097080 | A1 | 8/2008 |
| WO | WO 2013/112042 | A1 | 8/2013 |

* cited by examiner

FEEDING SYSTEM AND METHOD FOR FEEDING ANIMALS

The invention relates to a feeding system for feeding animals, in particular cows, such as dairy cows or meat cows.

EP 2134161 A1 discloses an automatic feeding system for animals. The feeding system comprises a mixing device, a control device, a plurality of feeding areas and a feed measurement arrangement. The animals are usually divided into groups, for example based on the lactation stage or milk yield, with each group having a different feed requirement. Each group of animals has access to one of the feeding areas. The control device controls the mixing device in order to prepare a batch of feed according to a selected recipe. The batch of mixed feed is accommodated in an automatic feeding device which takes the batch of mixed feed to the feeding areas, so that the animals are able to eat from it. The feed measurement arrangement repeatedly measures the quantity of mixed feed which is present at the feeding areas. The control device repeatedly compares the measured remaining quantity of mixed feed in the feeding areas with a threshold value. The threshold value can be set separately for each feeding area, for example by a farmer. If the measured remaining quantity of mixed feed in one of the feeding areas falls below the threshold value, the control device sends a command to the mixing device to prepare a subsequent batch of feed according to the selected recipe. The threshold value is chosen such that there is sufficient time to mix the subsequent batch of feed and supply it to the feeding areas before the feed for the animals at the feeding areas finishes. In other words, the preparation of a subsequent batch of feed is started well before the remaining quantity of feed at one of the feeding areas is 0. Therefore, the animals are always able to eat. It is well-known that this is particularly desirable for the milk yield of dairy cows.

However, the operation of this feeding system is not optimal. The threshold values are set in such a way that there is always feed present in the feeding areas, but if the feed is left for a prolonged period of time, the quality of the feed diminishes. When choosing the threshold values, the farmer has to find a compromise between on the one hand ensuring that the animals can always eat and on the other hand maintaining the quality of the feed, in particular the freshness. It is difficult to choose such threshold values accurately, and even carefully selected threshold values are always excessively high for a large part of each day (24 hours). The reason for this is the fact that the feed consumption varies throughout the day. The animals eat significantly more, for example, at the start of the morning or in the afternoon than they do at night. Nevertheless, the threshold value is chosen such that the animals are always able to eat feed. In other words, the threshold value is set on the basis of the highest rate of consumption. The threshold value is so high that a subsequent batch of feed, when the animals eat quickest, is delivered at the feeding area in time. But at any other point in time during the day, when the animals eat less quickly, the same threshold value is applied. This means that a subsequent batch of feed is virtually always delivered at the feeding area unnecessarily early, i.e. while there is still sufficient feed. In other words, the known feeding system does not take variations in the feed consumption into account, in particular the day and night rhythm of the animals. Consequently, the feed is less fresh, as a result of which the feed intake of the animals is not optimal.

It is an object of the invention to provide an improved feeding system, in which, in particular, the feed intake by the animals is increased.

According to the invention, this object is achieved by a feeding system for feeding animals, in particular cows, such as dairy cows or meat cows, at at least one feeding place feed from a feed supply, i.e. the feeding system may comprise a feed supply of feed for the animals, and one or more feeding places for feeding the animals feed from the feed supply, at least when the feeding system is in operation and/or installed on a farm, and wherein the feeding system comprises the following:

- at least one autonomous feeding device comprising a container for accommodating a batch of feed from the feed supply, wherein the autonomous feeding device is configured to take feed held in the container to one or more of the feeding places and dispensing it at those one or more feeding places,
- a feed-quantity measuring device for repeatedly measuring a feed-quantity value for the quantity of feed which is available and/or present for consumption by the animals at the or each feeding place, and
- a control system which is configured to receive the feed-quantity values from the feed-quantity measuring device measured at the or each feeding place at different measurement instants,
  - wherein the control system is configured to store a plurality of feed-quantity values received from the feed-quantity measuring device in a memory, and the control system is furthermore configured to calculate, on the basis of the feed-quantity values stored in the memory, one or more values of a feed variable, which in particular relates to the course of the feed-quantity values over time, i.e. the values of the feed variable depend on the changes of the feed-quantity value over time, at one or more points in time after the last measurement instant.

With the above-mentioned known feeding system, each measured quantity of feed is compared to a threshold value and discarded or deleted after this comparison. In each case, only one measured quantity of feed is compared to the threshold value. If the measured quantity of feed is greater than the threshold value, no action is taken, and if the measured quantity of feed is smaller than the threshold value, the control device controls the mixing device so as to mix a subsequent batch of feed. In contrast to this known feeding system, the measured values for the quantity of feed according to the invention are not discarded or deleted, but stored in a memory of the control system, such as a memory on a computer at the farm, on a server at the manufacturer of the feeding system, in a cloud storage or in yet another manner.

The plurality of feed-quantity values which have been measured at different measurement instants contain information about variations in the rate of consumption, i.e. the rate with which the quantity of feed at the or each feeding place decreases. The rate of consumption depends, for example, on the day and night rhythm of the animals. According to the invention, storing a plurality of feed-quantity values measured at the or each feeding place at different points in time makes it possible to deduce the course of the feed-quantity values over time. This course over time depends on variations in the feed consumption, i.e. the rate of consumption. If the control system calculates one or more values of a feed variable, such as the feed quantity or another feed variable which represents the course of the feed-quantity values over time, on the basis of the feed-quantity values for the or each feeding place stored in the memory at one or more points in time after the last measurement instant, i.e. after the time of the feed-quantity value measured last and stored in the memory, this calculation therefore takes into account any variations in the rate of consumption.

Incidentally, the one or more points in time at which the values of the feed variable are calculated and which are later than the last measurement instant may comprise instants in the past, the current instant ("real time") and/or future instants. If, for example, the last feed-quantity value was measured an hour ago, the control system may calculate a value of the feed variable for half an hour ago and/or at the current instant and/or at one or more future instants. Calculating values of the feed variable at such instants yields particular advantages.

The control system can use the calculated value(s) of the feed variable in various ways to control the feeding system more reliably and accurately. In particular, the control system may be configured to control the feeding system based on the calculated value(s) of the feed variable to determine when a subsequent batch of feed should be supplied to the feeding place by the autonomous feeding device. According to the invention, calculating the value(s) of the feed variable at points in time after the last measurement instant makes it possible, for example, to accurately predict when the feed at the or each feeding place will finish or how much time remains until this is the case. Based on the calculated value(s) of the feed variable, the control system according to the invention can control the feeding system in such a way that it loads a subsequent batch of feed into the autonomous feeding device and/or causes the autonomous feeding device to take it to the feeding place. In this case, for example, the time it takes to prepare this subsequent batch of feed and to take it to the feeding places and dispense it by means of the autonomous feeding device is taken into account. The feeding system according to the invention can therefore not only ensure that there is always feed present at the feeding places, but it also makes it possible to deliver the subsequent batch of feed at the feeding places at a more accurate time ("on-time feeding"). As a result thereof, the quality of the feed at the feeding places is preserved more efficiently, so that the feed intake by the animals is increased and feed losses are reduced.

In a preferred embodiment according to the invention, the feed variable is the feed quantity for the quantity of feed which is available and/or present for consumption by the animals at the or each feeding place. In other words, according to the invention it is preferable for the control system to be configured to calculate, on the basis of the feed-quantity values stored in the memory, one or more feed-quantity values for the quantity of feed which is available and/or present for consumption by the animals at the or each feeding place at one or more points in time after the last measurement instant. However, instead of or in addition to calculating feed-quantity values after the last measurement instant, the control system may also be configured to calculate, on the basis of the feed-quantity values stored in the memory, one or more values for at least one other feed variable at the or each feeding place which characterizes the course of the feed-quantity values over time, at one or more points in time after the last measurement instant.

For example, the feed variable is representative for the rate of consumption after the last measurement instant at which the quantity of feed which is available and/or present for consumption by the animals at the or each feeding place decreases at this feeding place. The control system may be configured to determine a rate of consumption at the or each feeding place after the last measurement instant on the basis of the feed-quantity values stored in the memory, for example up to the current instant, i.e. the rate of consumption at the or each feeding place in "real time", or in the future, such as 2 hours or 6 hours or 12 hours in advance. The rate of consumption at the or each feeding place is understood to mean the rate at which the quantity of feed which is available for consumption by the animals decreases at this feeding place. Once the rate of consumption has been determined, the control system can, on the basis thereof, adjust for example the feeding system so that it delivers a subsequent batch of feed at the or each feeding place at a desired point in time. Thus, the timing for adding feed can be made more accurate. This results in a significantly improved feed intake and reduced feed loss.

It is furthermore possible for the feed variable to be representative of a time duration, for example until a next feeding action is desired, such as replenishing feed at one or more feeding places. In this case, a time duration until the subsequent desired feeding action may in each case be added to each measured feed-quantity value stored in the memory. In other words, the control system may first convert the measured feed-quantity values to an associated time duration until the next desired feeding action. Then, the control system is able to calculate, on the basis of the converted values of the time duration until the next desired feeding action, one or more values for this time duration at the or each feeding place at one or more points in time after the last measurement instant. In this case, the control system does not have to calculate any feed-quantity values at points in time after the last measurement instant, but, at those points in time, the control system can calculate directly how long it will take until the next feeding action is desired.

In a preferred embodiment according to the invention, the feeding system comprises a feed-loading system for loading feed from the feed supply into the container of the autonomous feeding device. According to the invention, the feed-loading system may be configured in different ways.

It is possible, for example, for the container of the autonomous feeding device to comprise a mixing device for mixing the feed held in the container. The feed-loading system can load feed from the feed supply, in particular different types of feed, into the container of the autonomous feeding device, after which the mixing device of the autonomous feeding device mixes the feed held in the container to produce a mixed batch of feed. The autonomous feeding device then takes the mixed batch of feed to the one or more feeding places. Incidentally, the feed in the container of the autonomous feeding device may already be prepared, i.e. the batch of feed may be loaded beforehand, before the autonomous feeding device starts taking the feed to the one or more feeding places.

However, according to the invention, it is also possible for the feed-loading system to comprise a stationary mixing device for mixing feed. The stationary mixing device is for example configured to accommodate a quantity of feed which corresponds to a single batch of feed in the container of the autonomous feeding device. In this case, the feed-loading system is configured to load feed from the feed supply into the stationary mixing device, and to load the mixed feed from the stationary mixing device into the container of the autonomous feeding device in order to form a mixed batch of feed therein. Subsequently, the autonomous feeding device transports the mixed batch of feed to the feeding places. In this case as well, the batch of feed may already have been made available premixed in the stationary mixing device before the mixed feed is loaded into the container of the autonomous feeding device.

Furthermore, the stationary mixing device may be configured to accommodate a quantity of feed which corresponds to a plurality of batches of feed in the container of the autonomous mixing device. For example, the feed in the stationary mixing device is premixed in order to form a stock quantity of mixed feed therein, a portion of which can then be loaded into the container of the autonomous feeding device in order to form the mixed batch of feed for dosing out at the one or more feeding places. In other words, the stock quantity of mixed feed is prepared beforehand in the stationary mixing device in order to load a batch of feed into the container of the autonomous feeding device therefrom.

Irrespective of the embodiment of the feed-loading system, it is preferable for the control system to be configured to control, on the basis of the one or more calculated values of the feed variable, the feed-loading system and/or the autonomous feeding device to load a subsequent batch of feed into the container of the autonomous feeding device and/or to take a subsequent batch of feed which has been loaded into the container of the autonomous feeding device to the feeding place. In particular, the control system is configured to control, on the basis of the one or more calculated values of the feed variable, the feed-loading system and/or the autonomous feeding device to start loading a subsequent batch of feed into the container of the autonomous feeding device or to take a subsequent batch of feed which has already been loaded into the container of the autonomous feeding device to the feeding place.

In this case, it is possible for the control system to be configured to determine a starting time to start loading a subsequent batch of feed and/or to take a loaded subsequent batch of feed to the feeding place on the basis of the one or more calculated values of the feed variable. The control system may in this case be configured to send a start command to the feed-loading system at the starting time to start loading the subsequent batch of feed or to the autonomous feeding device to start taking an already loaded batch of feed to the feeding place.

In an embodiment in which the feed is mixed in the container of the autonomous feeding device, loading a subsequent batch of feed into the container of the autonomous feeding device is started by sending a start command to the feed-loading system to transfer feed from the feed supply to the container of the autonomous feeding device. If a batch of feed has already been loaded into the container of the autonomous feeding device, it is possible to start taking this batch of feed to the feeding places immediately—the autonomous feeding device then receives a corresponding start command.

With a feed-loading system comprising a stationary mixing device which in each case mixes only one batch of feed, starting to load a subsequent batch of feed into the container of the autonomous feeding device may be understood to mean that the feed-loading system receives a start command to load feed from the feed supply into the stationary mixing device in order to form the mixed batch of feed therein, following which the mixed batch of feed from the stationary mixing device is loaded into the container of the autonomous feeding device. The feed is loaded into the container of the autonomous feeding device via the stationary mixing device.

If a relatively large stock quantity of mixed feed has been prepared in the stationary mixing device, then starting to load a subsequent batch of feed into the container of the autonomous feeding device means that the feed-loading system receives a start command to load feed from this stationary mixing device into the container of the autonomous feeding device in order to form a mixed batch of feed therein.

According to the invention, it is preferable with the above-described and other possible embodiments of the feed-loading system for the control system to control the loading of a subsequent batch of feed and/or the taking of an optionally already loaded batch of feed to the one or more feeding places on the basis of the calculated value(s) of the feed variable. As a result thereof, the control system can accurately set a desired moment at which feed from this subsequent batch of feed is dosed out at the or each feeding place, i.e. the feeding system according to the invention is able to add feed to the feeding places at the desired time much more precisely. For example, the control is such that the animals always have fresh feed of high quality available to them.

In a preferred embodiment according to the invention, the control system is programmed with a self-learning or machine-learning algorithm which is configured to receive a plurality of feed-quantity values stored in the memory, wherein the control system is configured to calculate the one or more values of the feed variable at the one or more points in time after the last measurement instant using the self-learning or machine-learning algorithm. Using the self-learning or machine-learning algorithm makes it possible to produce more accurate calculations of the one or more values of the feed variable at points in time after the last measurement instant.

In a preferred embodiment according to the invention, the self-learning algorithm is configured to determine one or more values which are representative of the rate of consumption at the or each feeding place at and/or after the last measurement instant on the basis of the feed-quantity values stored in the memory, and the control system is configured to calculate the one or more values of the feed variable at the or each feeding place at the one or more points in time after the last measurement instant on the basis of the feed-quantity value at that feeding place measured last and stored in the memory and this value for the rate of consumption at this feeding place.

In this case, the self-learning or machine-learning algorithm determines, for the or each feeding place, a value which is representative for the rate of consumption at this feeding place at and/or after the last measurement instant. Then, the control system calculates the value(s) of the feed variable, in particular the feed-quantity value or values, after the last measurement instant at the or each feeding place by taking the feed-quantity value measured last and stored in the memory as a starting point and subtracting the decrease in the feed-quantity value over time on the basis of the rate of consumption. As a result thereof, the calculated values of the feed variable for points in time after the last measurement instant are particularly accurate.

The algorithm may be configured in various ways. For example, the self-learning algorithm is configured to receive examples, preferably for each feeding place separately, which each comprise a value which is representative of one of the measurement instants, a feed-quantity value at that measurement instant and an associated value for the rate of consumption. The examples may comprise further time-dependent parameters, such as the time elapsed since the last feed delivery at the feeding place and/or the quantity of feed (kg) which was dispensed at the feeding place during an elapsed period of a preset duration, for example the past 5 hours or 10 hours. The self-learning algorithm is trained by means of such examples which, for example, have been collected as historical data for a period of one or two months or longer. The more examples are available for the algorithm, the better the algorithm is able to learn.

The algorithm may be fed, for example, a first example of a feed-quantity value measured at a first measurement instant $t_1$, a value which is representative of that measurement instant $t_1$, and any further time-dependent parameters as input, and an associated value for the rate of consumption at that first instant $t_1$ as output, a second example of a feed-quantity value measured at a second instant $t_2$, a value which is representative of that measurement instant $t_2$, and again any further time-dependent parameters as input, and a feed-quantity value measured at that second instant $t_2$ as output, etc.

The algorithm is configured to recognize correlations, i.e. statistical relations, between the feed-quantity values measured at different measurement instants and stored in the memory dependent on one or more associated time-dependent parameters at the or each feeding place as input and the values for the rate of consumption as output. The algorithm uses pattern recognition. Based on the correlations recognized, the algorithm can then determine a value for the rate of consumption at the feeding place at and/or after the last measurement instant as output, in particular predict it for the future, if a measured feed-quantity value stored in the memory having the value which is representative of that last measurement instant and, optionally, the further time-dependent parameters as input is presented to the algorithm. Preferably, the control system uses the last-measured feed-quantity value at the or each feeding place stored in the memory. The last-measured feed-quantity value is an important parameter for an accurate prediction.

After the self-learning algorithm has been trained sufficiently, the self-learning algorithm is able to determine the value for the rate of consumption at the or each feeding place at and/or after the last measurement instant on the basis of pattern recognition in the examples received. Subsequently, the control system may calculate the value(s) of the feed variable, in particular the feed-quantity value or values, at one or more points in time after the last measurement instant on the basis of that value for the rate of consumption. By using the algorithm, variations in the feed consumption by the animals, such as the day and night rhythm, are intrinsically taken into account, so that the feeding system can deliver the subsequent batch of feed to the feeding place (virtually) exactly on time ("on-time feeding"). This is advantageous for the feed intake of the animals and reduces feed losses.

In a particularly preferred embodiment according to the invention, the control system is configured to divide the feed-quantity values stored in the memory into groups over time, which each start with a feed-quantity value which is measured immediately after the delivery of feed and end with a feed-quantity value which is measured immediately before the delivery of feed. In this case, it is possible for the control system to be configured to calculate, for each of these groups of feed-quantity values ($h_{-n}$), in particular by a function fit (or "curve fit"), a value for a parameter A in an exponential function with $e^{\lambda t}$, such as $N \cdot e^{\lambda t}$, wherein $\lambda$ is representative of the rate of consumption and t is the time, and N is a constant, such as 100. In this case, the self-learning algorithm may be configured to receive examples which each comprise a feed-quantity value at a measurement instant and an associated calculated value for the parameter $\lambda$, wherein the self-learning algorithm is furthermore configured to determine a value for the parameter $\lambda$ in an exponential function with $e^{\lambda t}$, in particular the above-mentioned function $N \cdot e^{\lambda t}$, which runs through the last-measured feed-quantity value stored in the memory. The control system is configured to then calculate the value(s) of the feed variable, in particular the feed-quantity value or values, at the one or more points in time after the last measurement instant by means of this exponential function using the value for the parameter $\lambda$ determined by the self-learning algorithm. In this particular preferred embodiment, it is assumed that the feed-quantity values have an exponential course over time. As a result thereof, deviating measurements are forced into that exponential course, as it were. Surprisingly, it was found that the self-learning algorithm is very accurate as a result thereof.

Instead of calculating feed-quantity values at one or more points in time after the last measurement instant by first determining a rate of consumption, it is also possible, according to the invention, for the self-learning algorithm to directly predict one or more feed-quantity values after the last measurement instant, based on an input which comprises the measured feed-quantity values stored in the memory, in combination with values which are representative of associated measurement instants and optionally further time-dependent parameters. Such an algorithm may also be trained and lead to satisfactory prediction results. Therefore, in an alternative embodiment according to the invention, the self-learning algorithm may be configured to determine one or more feed-quantity values at the or each feeding place after the last measurement instant as output, based on the measured feed-quantity values stored in the memory as input. In this case, the control system may be configured to determine the starting time based on those one or more calculated feed-quantity values at the or each feeding place. On the basis of a plurality of feed-quantity values stored in the memory, the algorithm according to the invention can learn the course of the feed-quantity values over time and predict feed-quantity values after the last measurement instant. In other words, at the or each feeding place, the control system determines the quantity of feed after the last measurement instant. Based on the one or more calculated feed-quantity values, the control system then determines the starting time to start loading a subsequent batch of feed and/or to deliver an already loaded batch of feed. As a result thereof, it is also possible to ensure that the animals at the feeding places can virtually always eat, while simultaneously maintaining the quality of the feed at the feeding places at a high level by adding feed as late as possible.

In a particular preferred embodiment according to the invention, the control system is configured to determine a future depletion time or instant for the or each feeding place on the basis of the calculated value of the feed variable. In particular, the depletion time is determined by the point in time at which the feed-quantity value at this feeding place falls below a preset threshold value for the quantity of feed at this feeding place. If the control system calculates the feed-quantity values at points in time after the last measurement instant, the control system is able to determine when the feed-quantity value drops below the threshold value. The control system is furthermore configured to determine the starting time on the basis of that future depletion time for the or each feeding place. The threshold value corresponds to a residual quantity of feed which is substantially no longer suitable for consumption by the animals or will, in practice, no longer be eaten by the animals. In other words, the threshold value is effectively a zero value—when the threshold value is reached, the feed is finished, even though there is still a small residual quantity of feed present. The point in time at which the feed finishes at the or each feeding place is the depletion time. The control system is able to predict the depletion time accurately and reliably for the future and, on the basis thereof, determine the starting time to start loading the subsequent batch of feed and/or delivering an already loaded batch of feed.

It should be noted that the effective zero threshold value according to the invention differs from the above-mentioned threshold value known from EP 2134161 A1. As has already been explained, this known feeding system compares each measured quantity of feed to a threshold value, and if the measured quantity of feed falls below this threshold value, then this is a trigger for mixing the subsequent batch of feed. This threshold value is always chosen to be greater than 0 in such a way that there is sufficient time to mix the next batch and deliver it to the animals. However, the threshold value according to the invention is an effective zero value, i.e. corresponds to an "empty" feeding place. The measured feed-quantity values are not compared to the effective zero value, and obviously this threshold value also does not constitute a trigger to prepare a subsequent batch of feed—after all, the feed is already finished when this threshold value is reached. The threshold value according to the invention is only used to determine when the feed actually finishes, i.e. the depletion time.

According to the invention, it is preferred that the control system is configured to determine the starting time by calculating back from that future depletion time for the or each feeding place at least by such a time interval, that the subsequent batch of feed is dispensed at these one or more feeding places by the autonomous feeding device before the animals have substantially eaten the feed at the one or more feeding places. The animals have substantially eaten the feed if only a residual quantity of feed remains which is essentially no longer suitable for consumption by the animals or will, in practice, no longer be eaten by the animals. In other words, when the animals have substantially eaten the feed, there may still be a small residual quantity of feed present at the feeding places. The time interval for calculating back the starting time depends, in particular, on the required time duration for loading the next batch of feed and/or delivering that feed. When the control system has determined the depletion time, the control system determines a starting time which precedes the depletion time by at least said time interval to start loading the next batch of feed and/or supplying a loaded subsequent batch of feed to one or more of the feeding places. This ensures that there is always feed present for the animals, while that feed is added as late as possible. This results in a high feed intake, reduced loss of feed and maintains the quality of the feed for a longer period of time.

Said time interval for the or each feeding place is chosen, for example, to be a fixed period in the control system. The fixed time interval may be input manually into the control system by a farmer or service technician, or may be calculated by the control system and be set automatically. The fixed time interval is, for example, between 30 minutes and 3 hours. Such a time interval is usually sufficient in practice to prepare a subsequent batch of feed, to load it and take it to the feeding places and dispense it.

In a particular embodiment according to the invention, the control system is furthermore configured to determine the time interval for the or each feeding place on the basis of a selected ration which is used to load the next batch of feed. According to the invention, various rations may be stored in the memory of the control system. The control system may select a ration from the rations stored in the memory, following which the next batch of feed is loaded in accordance with that selected ration. A ration comprises different types of feed in a predetermined ratio (kg). In general, the feeding system according to the invention is adapted to be able to compose a batch of feed in accordance with different rations, as the feed requirements of the animals vary with time. For example, the feed requirement of dairy cows depends on the lactation stage. Furthermore, the dairy cows are in practice usually divided into groups, based on the lactation stage or milk yield, with each group having a different feed requirement. The farmer can select one of the rations manually, or the control system is configured to automatically select a ration on the basis of a feed requirement at one or more of the feeding places. In particular, the control system determines the feed requirement for a specific ration in dependence on the feeding place where the feed-quantity values were measured. However, preparing one ration may take more time than preparing another ration. In order to further refine the timing of adding feed, the control system may take the time required to prepare a subsequent batch of feed in accordance with a selected ration into account.

In addition, the time which the autonomous feeding device takes to reach the various feeding places may differ. One feeding place may be closer to the feed supply than another feeding place. In order to make the timing for delivering the feed more accurate, it is possible, according to the invention, for the control system to be configured to determine a delivery or travel time for taking the feed held in the container to the one or more feeding places by means of the autonomous feeding device, wherein the control system is furthermore configured to determine the time interval for the or each feeding place based on this delivery or travel time.

In a particular embodiment according to the invention, the control system is configured to calculate a depletion time duration for the or each feeding place, in particular by determining the time period until the calculated feed-quantity value at this feeding place decreases to below a preset threshold value for the quantity of feed at this feeding place, and wherein the control system is furthermore configured to determine the starting time on the basis of this depletion time duration for the or each feeding place. Instead of or in addition to predicting a future depletion time or instant, it is possible, according to the invention, to calculate the depletion time duration, i.e. how long it takes until the feed at the or each feeding place is effectively finished. In this case, it is possible for the control system to be configured to compare this depletion time duration for the or each feeding place to a time interval for loading the subsequent batch of feed and/or delivering that feed. Said time interval may be determined as described above.

In a particular preferred embodiment according to the invention, the feed-quantity measuring device is fitted to the autonomous feeding device, wherein the feed-quantity measuring device is configured to measure the feed-quantity value at the or each feeding place when the autonomous feeding device moves past this feeding place. Preferably, the autonomous feeding device furthermore comprises a feed-pushing device for pushing feed in a direction at right angles to the direction of movement or travel of the autonomous feeding device. For example, the feed-pushing device is configured to push feed which was situated along a feed fence and was pushed away from the feed fence by the animals while eating, back to the feed fence.

According to the invention, it is furthermore possible for the container of the autonomous feeding device to comprise a dispensing device for dispensing feed from the container, wherein the feed-quantity measuring device is fitted to the autonomous feeding device in such a way with respect to the dispensing device that, when measuring the feed-quantity value, the quantity of feed which was just dispensed by the dispensing device is included. In other words, the quantity of feed which is dosed out by the autonomous feeding device is immediately included when measuring the quantity of feed which is present at the or each feeding place for consumption by the animals. In this case, the feed-pushing device may be configured to push feed which was dispensed by the autonomous feeding device. In other words, when the feed is discharged from the container of the autonomous feeding device, this feed is immediately formed into piles by pushing. Then, the feed-quantity measuring device measures the pushed or piled-up feed, which comprises both feed which was already present at the feeding place and freshly dosed-out feed.

With the feeding system known from EP 2134161 A1, the feed-measuring system comprises a plurality of measuring units—each feeding area has its own measuring unit. These measuring units have to be connected to the control device in order to transmit the measured remaining quantities of mixed feed at the feeding areas. A wired connection is cumbersome and complicated, whereas a wireless connection in an animal shed virtually always suffers from connectivity problems. Although not described in the above-mentioned patent publication, it would be possible to use only a single measuring unit by attaching it to the automatic feeding device. This is known, for example, from the automatic feeding system Vector® by Lely. While the automatic feeding device travels past the feeding areas, this measuring unit measures the remaining quantities of feed. However, in order to guarantee that a new batch of feed is delivered to the feeding area in time, using the method known from EP 2134161 A1, regular checks would have to be performed to ascertain that sufficient feed is still available at the feeding areas. The automatic feeding device would have to travel past the feeding areas relatively often in order in each case to measure the remaining quantity of feed at every feeding area and compare it to the threshold value. This means that the automatic feeding device would often travel with an empty container only for the purpose of measuring, and without delivering feed to the feeding areas or pushing feed. As a result, the capacity of the feeding system would decrease, the automatic feeding device would be less efficient, have a relatively high power consumption and the service life of parts, such as batteries, would be adversely affected.

Due to the fact that the feeding system according to the invention, in contrast to the method known from EP 2134161 A1, calculates one or more values of a feed variable, in particular feed-quantity values, at points in time after the measurement instants, and on the basis thereof determines when the next batch should be loaded and/or delivered to the feeding places, the autonomous feeding device according to the invention has to drive around less often. Although the rate of consumption at a feeding place may, in exceptional cases, be so low, that it is desirable to measure additional feed-quantity values in the interim, i.e. in addition to driving the autonomous feeding device to dispense feed and/or pile it up, this is usually not necessary. The autonomous feeding device according to the invention virtually only travels to the feeding places to actually deliver feed or to pile it up. Each time the autonomous feeding device delivers feed at one or more of the feeding places or piles up the feed, the feed-quantity values at these feeding places are measured. The feed-quantity values measured at those instants are sufficient for the control system according to the invention to determine the starting time for adding feed. As a result thereof, the capacity of the feeding system according to the invention is optimal, and the autonomous feeding device with the incorporated feed-quantity measuring device according to the invention can operate in a particularly effective and energy-efficient manner.

The feeding places may be configured in different ways. It is preferable if the or each feeding place comprises a feed fence for feeding the animals, such as in an animal shed, wherein the autonomous feeding device is configured to autonomously take a batch of feed held in the container from the feed supply to the feed fence and to autonomously dispense and/or dose that feed along the feed fence.

The invention also relates to a method for automatically feeding animals, in particular cows, such as dairy cows or meat cows, by means of a feeding system as described above, the method comprising the following steps:

- repeatedly measuring a feed-quantity value for the quantity of feed which is present for consumption by the animals at the or each feeding place,
- storing a plurality of feed-quantity values measured at the or each feeding place at different measurement instants in the memory of the control system,
- calculating at least one value of a feed variable, which in particular relates to the course of the feed-quantity values over time, at at least a point in time after the last measurement instant on the basis of the feed-quantity values stored in the memory.

The method according to the invention has the same technical effects and advantages as described above with regard to the feeding system according to the invention.

The invention will now be explained in more detail by means of the attached figures, in which.

Figure 1:
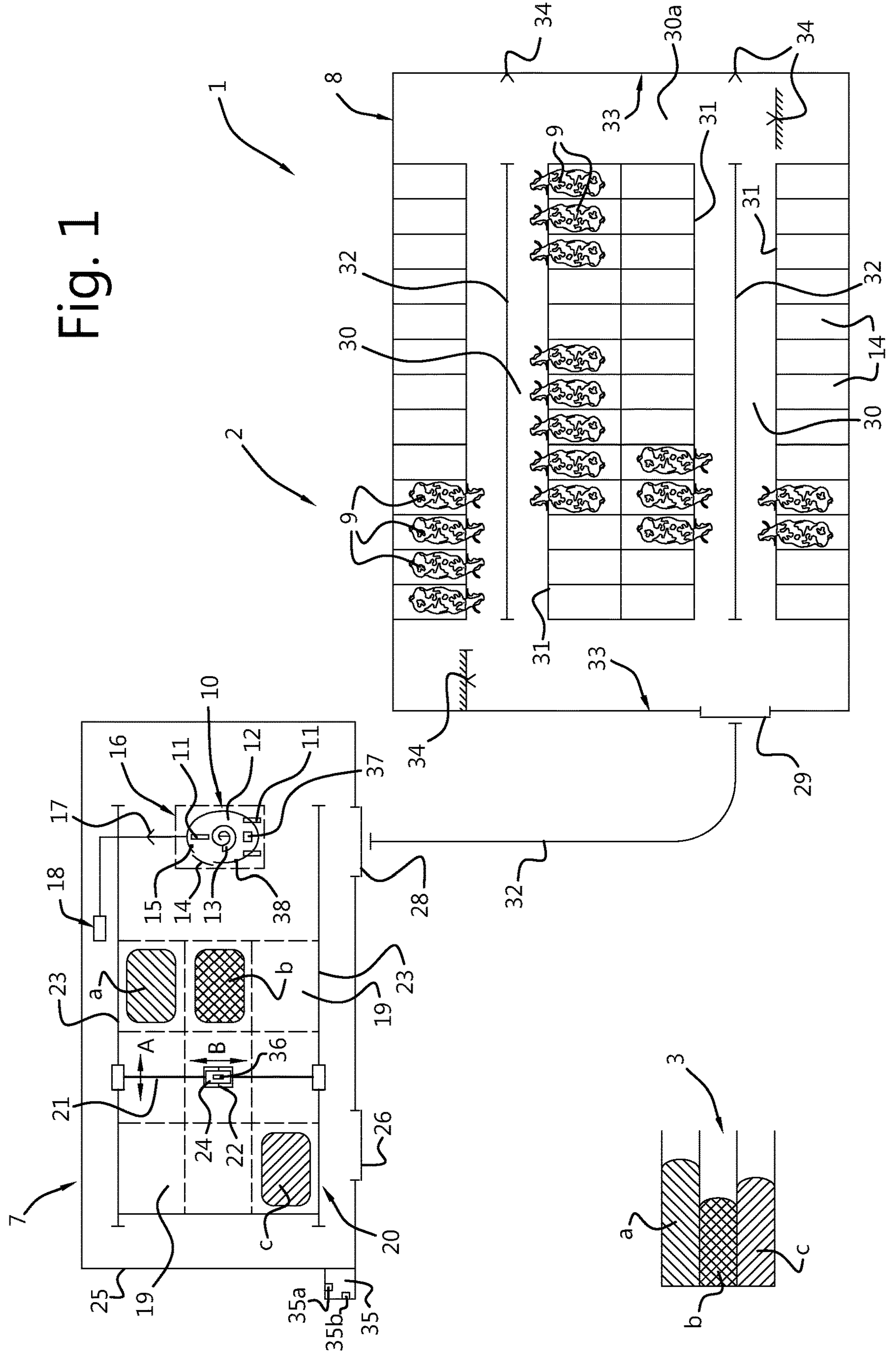
FIG. 1 shows a diagrammatic top view of a feeding system according to the invention.

The feeding system for feeding animals, in particular cows, such as dairy cows or meat cows, is denoted overall by reference numeral 1 in FIG. 1. The feeding system 1 is arranged in an operational area 2. The feeding system 1 comprises a feed storage 3 containing a plurality of feed types a, b, c, a feed supply 7 containing the same feed types a, b, c, an animal shed 8 containing the animals 9, and an autonomous feeding device 10 for feeding the animals 9 feed from the feed supply 7. Although the feed storage 3 shown diagrammatically in FIG. 1 comprises three adjacent silos containing feed types a, b, c, for example silage, the feed storage 3 may comprise further storage devices and/or types of feed, such as tower silos containing bulk feed, for example corn, potatoes and/or beets, or pressed bales. In the same way, the feed supply 7 may also contain more than the three feed types a, b, c shown in FIG. 1. Obviously, the operational area 2 may optionally also contain a dwelling, one or more further animal sheds, sheds and other buildings (not shown).

In this exemplary embodiment, the autonomous feeding device 10 for feeding the animals 9 is configured as a self-propelled feed wagon. Obviously, it is possible, according to the invention, for the feeding system 1 to comprise more than one autonomous feed wagon 10, in particular two autonomous feed wagons 10 (not shown). By means of wheels 11, the feed wagon 10 is movable across a floor, farmyard or other ground surface. The feed wagon 10 comprises a container 12 for accommodating a batch of feed. In this exemplary embodiment, a mixing device 13 for cutting and/or mixing feed is provided in the container 12. A dispensing device 14 is provided in order to dispense and/or dose the feed from the container 12. The dispensing device 14 comprises, for example, a door which is displaceable between a closed and an open position.

The feed wagon 10 is autonomously displaceable by means of a driving and steering system for driving and steering the feed wagon 10 (not shown). The driving and steering system of the feed wagon 10 is controllable by means of a control unit 15 of the feed wagon 10. In this exemplary embodiment, the driving and steering system comprises an electrical drive motor (not shown) for each rear wheel 11. The electrical drive motors of the rear wheels 11 are controllable independently from one another. By controlling the rotary speed of the rear wheels 11, the feed wagon 10 can travel forwards or backwards in a straight line or make a bend.

The driving and steering system comprises a battery system for storing electrical energy (not shown). The battery system is connected to the electrical drive motors. In FIG. 1, the feed wagon 10 is situated at a feed loading station 16, at which the container 12 of the feed wagon 10 is filled with feed. The feed loading station 16 comprises a charging point 17 of a charging system 18 for charging the battery system of the feed wagon 10. The feed loading station 16 therefore also acts as a charging station. The control unit 15 of the feed wagon 10 is configured to control the mixing device 13 in such a way that the mixing device 13 mixes the feed contained in the container 12, while the feed wagon 10 is connected to the charging point 17 and the battery system of the feed wagon 10 is charged by means of the charging system 18.

In this exemplary embodiment, the feed supply 7 forms a feed kitchen, i.e. an intermediate feed storage. The feed kitchen comprises a number of feed storage areas 19 to accommodate the feed types a, b, c and optionally further feed types (not shown). The feed storage areas 19 are separated from each other—the feed storage areas 19 are, for example, formed by delineated spaces on a floor, on which a silage block or a pressed bale is situated. Also, one or more of the feed storage areas 19 may comprise a trough for accommodating bulk feed, such as corn, potatoes or beets. The capacity of the feed kitchen 7 is, for example, limited to a number of days. The quantities of feed of the feed types a, b, c which can be accommodated in the feed kitchen 7 are smaller than the quantities of feed of these feed types a, b, c which are stored in the feed storage 3.

A feed-loading system 20 is provided for transferring feed from the feed kitchen 7 to the container 12 of the feed wagon 10 if the feed wagon 10 is positioned at the feed loading station 16. In this exemplary embodiment, the feed-loading system 20 comprises a movable carrying rail 21 which is displaceably (see arrow A) arranged on two fixed carrying rails 23 which are arranged mutually parallel to and spaced apart from each other. The movable carrying rail 21 comprises a trolley 22 which is displaceable along the former (see arrow B). The trolley 22 is provided with a vertically displaceable feed grab 24 to grab feed from the feed storage areas 19. The feed grab 24 suspended from the trolley 22 can be displaced in a substantially horizontal plane so as to be situated above each of the feed storage areas 19.

The feeding system 1 according to the invention comprises a control system 35 with a memory 35*a*. Although the control system 35 in FIG. 1 is shown diagrammatically on the left-hand side, the control system 35 could also be arranged in a different location. The memory 35*a* may comprise a storage facility on a computer of the farm or a server at the manufacturer of the feeding system 1 which is connected to the control system 35 via the internet, a cloud storage or something else.

The feed grab 24 is controlled by the control system 35. Ration data are stored in the memory 35*a*. The ration data comprise, for example, a plurality of rations for different groups of animals 9. Based on the ration data of a selected ration, i.e. mixed feed of feed types in a desired ratio (kg), the feed grab 24 takes quantities of the feed types a, b, c from the feed storage areas 19 to the container 12 of the feed wagon 10, while the feed wagon 10 is situated at the feed loading station 16, in such a way that that the selected ration is accommodated in the container 10. By transferring a plurality of feed types to the container 12 of the feed wagon 10, a batch of mixed feed of feed types is produced therein according to the selected ration, i.e. a batch of mixed feed (kg) of feed types in a desired ratio.

In other words, in order to compose the batch of feed, the feed grab 24 in each case takes a quantity of feed from one of the feed storage areas 19, the feed grab 24 displaces that feed across the feed storage areas 19 until it is above the container 12 of the feed wagon 10 and then drops that feed into the container 12. The feed wagon 10 comprises a weighing device 37 which is configured to measure the weight (kg) of the feed which is accommodated in the container 12. The weighing device 37 is connected to the control system 35. When loading a batch of feed into the container 12 of the feed wagon 10, the control system 35 monitors how much feed (kg) of each feed type a, b, c is loaded into the container 12.

Obviously, the feed supply 7 and the feed-loading system 20 may also be configured differently. The feed grab 24 may, for example, also be incorporated in the feed wagon 10. In that case, the feed grab 24 of the feed wagon 10 loads the container 12 with the desired quantity of feed of the desired composition, in particular directly from the feed storage 3. Furthermore, instead of or in addition to the feed storage areas 19 shown in FIG. 1, the feed supply 7 may comprise one or more other feed supply devices, such as a driven conveyor belt for holding pressed bales or blocks cut from a silo in combination with a releasing device for releasing feed from such a bale or block, for example a cutter or blade, in particular a so-called "bale shredder", and/or a trough for bulk feed comprising an auger for the metered discharge of the feed, such as a so-called "commodity box", and/or a tower silo and/or something else. In this case, the feed-loading system may be provided with one or more driven conveyor belts for displacing the feed from the or each feed supply device to the container 12 of the feed wagon 10.

In addition, it is possible for the feed not to be mixed and/or cut in the container 12 of the feed wagon 10, but in a stationary mixer which is arranged near the feed supply 7 (not shown). In that case, the feed grab 24 loads a batch of feed from the feed supply system 7 into the stationary mixer. Following mixing and/or cutting by means of the stationary mixer, the mixed feed is loaded into the feed wagon 10. Thus, the container 12 of the feed wagon 10 does not have to contain a mixing device. In this case, it is possible for the stationary mixer in each case to receive a quantity of feed which corresponds to a single batch of feed for the container 12 of the feed wagon 10. However, the stationary mixer may also have capacity to accommodate and prepare a plurality of batches of feed for the container 12 of the feed wagon 10. The quantity of feed in the stationary mixer then forms a premixed quantity of feed which is supplied to the container 12 of the feed wagon 10 in portions, i.e. for a plurality of feeding rounds.

The feed kitchen 7 is surrounded by a safety fence 25. An access door 26 is provided in the safety fence 25, so that, for example, a fork-lift truck or tractor can enter the feed kitchen 7 via the access door 26 in order to replenish the feed storage areas 19 with the different feed types a, b, c from the feed storage 3. In addition, the safety fence 25 comprises a passage door 28 for the feed wagon 10. The feed wagon 10 can enter and exit the feed kitchen 7 via the passage door 28. Obviously, it is possible that the safety fence 25 only comprises one door, via which both the feed wagon 10 and the tractor or fork-lift truck can enter and exit the feed kitchen 7. Also, the safety fence 25 in FIG. 1 may extend to the left of the feed loading station 16 and the passage door 26, in which case the safety fence 25 protects the feed kitchen 7 containing the feed storage areas 19, but the feed loading station 16 is freely accessible via the passage door 26 (not shown).

In addition to the safety fence 25, the feeding system 1 may comprise further safety features, for example an emergency stop by means of which the feed wagon 10 and/or the feed-loading system 20 is stopped immediately. In this case, for example, an alarm may sound and/or a message may be sent to a user, such as an e-mail or text message.

The animal shed 8 comprises a door opening 29, via which the feed wagon 10 can enter and exit the animal shed 8. The door opening 29 is closable by means of a shed door which is preferably openable automatically. In this exemplary embodiment, the animal shed 8 has two feeding alleys 30. Obviously, more or fewer feeding alleys may be provided. In this exemplary embodiment, each feeding alley 30 is delimited on either side by a feeding fence 31. In other words, the animal shed 8 comprises four feeding fences 31. The feeding fences 31 each form a feeding place for feeding the animals 9. The animals 9 may be situated next to each other along the feeding fence 31. The animals 9 are positioned with their head turned towards the feeding alley 30 and are able to put their head through the feeding fence 31 in order to eat feed which has been deposited along the feeding fence 31 by the feed wagon 10.

The feeding fences 31 in the animal shed 8 are situated at a distance from the feed loading station 16 of the feed kitchen 7. Each of the feeding fences 31 is reachable by the feed wagon 10 from the feed loading station 16. Various beacons are arranged in the operational area 2. In this exemplary embodiment, the beacons are formed by strips 32 which are disposed in or on a floor or another ground surface, walls 33 of the animal shed 8 and impact points 34. The feed wagon 10 comprises a sensor system (not shown) which is configured to cooperate with the beacons 32, 33, 34. In addition, the feed wagon 10 comprises a gyroscope (not shown) in order to travel straight ahead over a predetermined distance. The gyroscope is connected to the control unit 15 of the feed wagon 10.

In addition to the ration data, the memory 35*a* of the control system 35 contains various other data, such as navigation data and operating data. The navigation data comprise beacon data of the beacons 32, 33, 34. On the basis of the navigation data, the feed wagon 10 can travel different routes from the feed loading station 16 to and through the animal shed 8. The operating data comprises, for example, operating data for operating the dispensing device 14 of the feed wagon 10.

According to the invention, the feed wagon 10 comprises a feed-quantity measuring device 38 for measuring a feed-quantity value for the quantity of feed for consumption by the animals 9 which is situated along the feed fence 31 which the feed wagon 10 passes. The feed-quantity measuring device 38 comprises, for example, a laser which measures the feed height (h in cm) of the feed along the feed fence 31. The quantity of feed at the feed fence 31 can be calculated on the basis of the measured feed height h. In this exemplary embodiment, the feed-quantity measuring device 38 is fitted to the feed wagon 10. The feed-quantity measuring device 38 measures the feed-quantity value h while the feed wagon 10 drives past the feed fence 31. Every time the feed wagon 10 drives past the feed fences 31, the feed-quantity measuring device 38 measures the associated feed-quantity values h.

In this exemplary embodiment, the feed wagon 10 comprises a feed-pushing device for pushing or piling up feed in a direction at right angles to the direction of travel of the feed wagon 10 (not shown), i.e. the feed-pushing device pushes feed which is situated along the feed fence 31 and which the animals 9 moved away from the feed fence 31 during eating, back towards that feed fence 31. The feed-quantity measuring device 38 is fitted to the feed wagon 10 in such a way that the feed which has just been deposited by the dispensing device 14 is included, i.e. the dispensing device 14 first doses out the feed from the container 12 in front of the feed fence 31 and immediately thereafter the feed-quantity measuring device 38 measures the feed-quantity value at that feed fence 31. This measured feed-quantity value depends on the quantity of feed which had not yet been eaten, i.e. was dispensed earlier and was pushed back to the feed fence 31, and on the quantity of fresh feed which was dosed out at that feed fence 31.

The control system 35 is configured to receive the feed-quantity values measured along the feed fences 31. The feed-quantity values are first temporarily stored in a memory of the control unit 15 of the feed wagon 10. After the feed wagon 10 has returned to the feed loading station 16, the measured feed-quantity values are sent to the control system 35 and stored in the memory 35*a* of the control system 35. The longer the feeding system 1 according to the invention is in operation, the more feed-quantity values are stored in the memory 35*a*, which have been measured at different measurement instants. By means of the memory 35*a*, the control system 35 is given large quantities of data regarding the course of the measured feed-quantity values over time at each of the various feed fences 31.

Figure 2A:
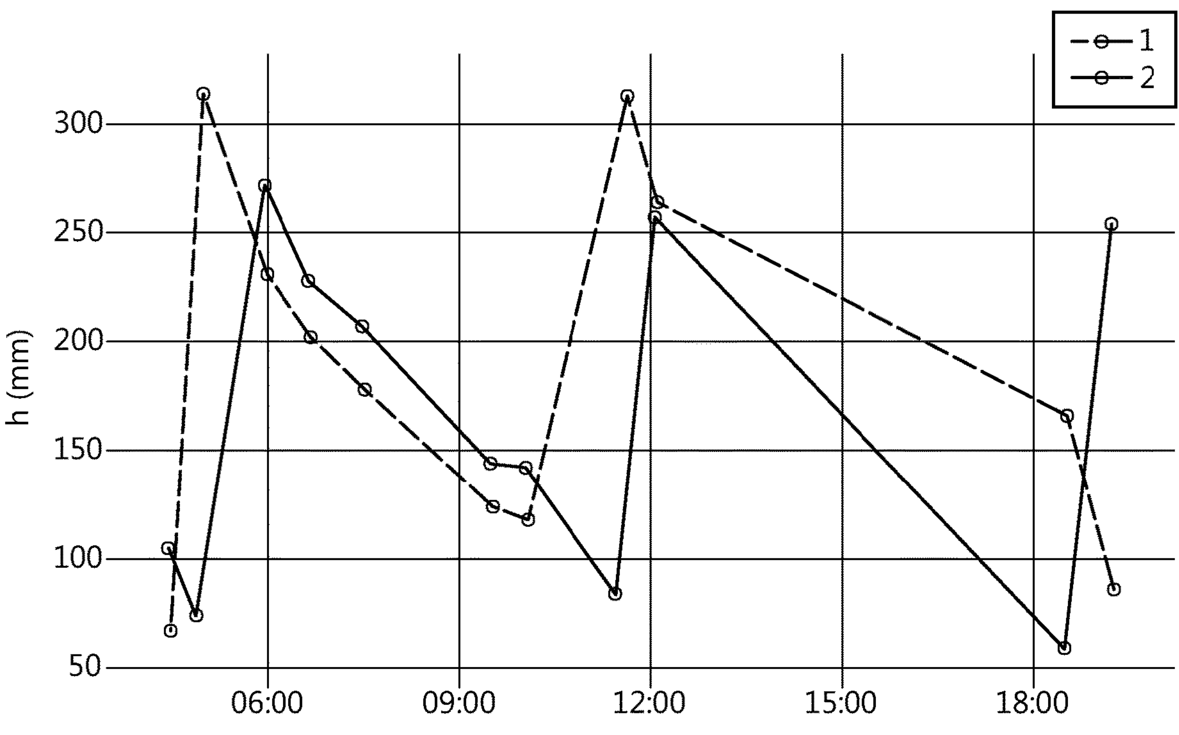
FIGS. 2A, 2B show graphs of measured feed-quantity values during a day and a plurality of days, respectively.
Figure 2B:
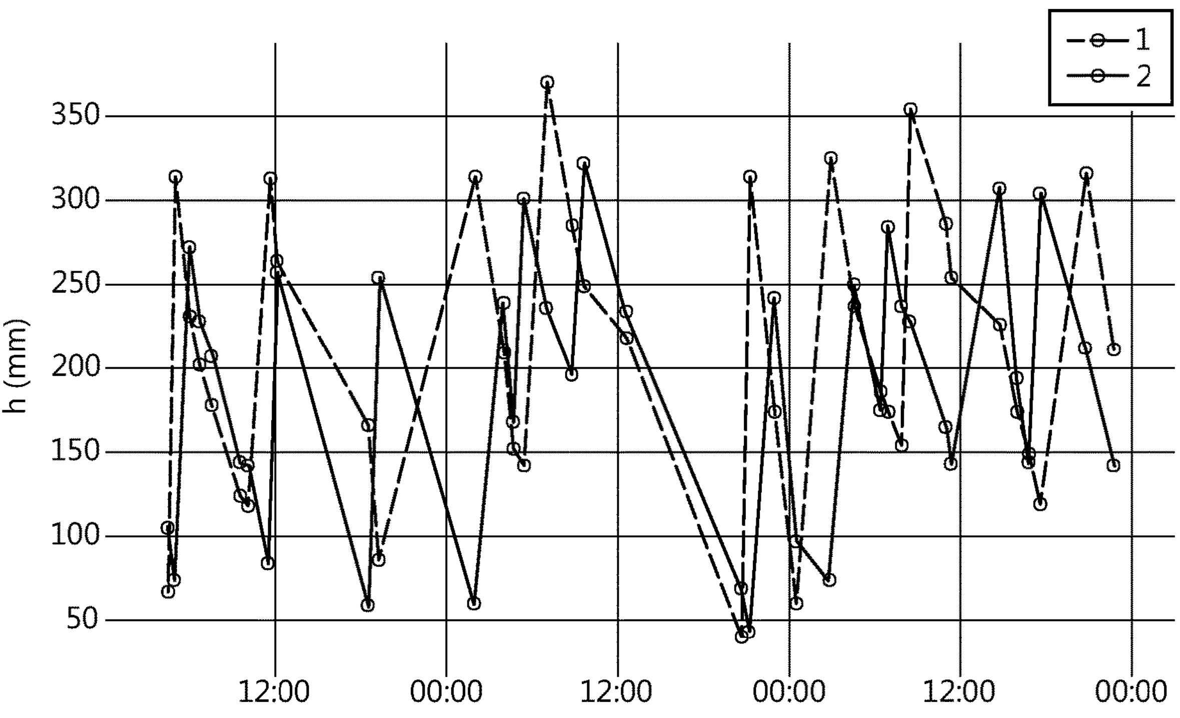

FIGS. 2A, 2B show graphs of measured feed-quantity values, which are stored in the memory 35*a*, for two feed fences 31 during a day and a plurality of days, respectively. In reality, feed-quantity values are stored and retained in the memory 35*a* of the control system 35 for a plurality of months or more. As is illustrated in the graphs, the feed-quantity value at each feed fence 31 in each case decreases over time until feed from a subsequent batch of feed is dosed out at that feed fence 31. The rate at which the feed-quantity value decreases, i.e. the rate of consumption, is different for each feed fence 31. This depends, for example, on the number of animals 9 along the feed fence 31 and the lactation stage of those animals 9, such as high-yield dairy cows, low-yield dairy cows, dry dairy cows, etc. In addition, the rate of consumption at each feed fence 31 varies throughout the day (24 hours). The rate of consumption depends on the day and night rhythm of the animals 9.

The control system 35 according to the invention is programmed by means of a self-learning algorithm **35*b* which is configured to recognize correlations, i.e. statistical relations, between the feed-quantity values measured at different measurement instants and stored in the memory 35*a*. In this exemplary embodiment, the self-learning algorithm 35*b* is configured to receive examples of input and output for each feed fence 31. The input of each example comprises a feed-quantity value at a measurement instant, a value which is representative of that measurement instant, and further time-dependent parameters, such as the time elapsed since the last feed deposit at that feed fence 31 and/or the quantity of feed (kg) which has been dispensed at that feed fence 31 during a previous period of a preset duration, for example the previous 5 hours or 10 hours. The output ("target") of each example comprises an associated value for the rate of consumption. The self-learning algorithm 35*b*** is trained by means of such examples.

The examples for each feed fence 31 are analyzed by dividing the feed-quantity values stored in the memory into groups over time. Each group starts with a feed-quantity value which is measured directly after feed has been dispensed, and ends with a feed-quantity value which is measured immediately before feed from a subsequent batch is dispensed. The memory of the control system 35 stores the instances when the feed wagon 10 drives to dispense feed or to pile up feed, i.e. the control system 35 records whether a feed-quantity value is measured immediately after feed has been dispensed at the feed fence 31.

Figure 3:
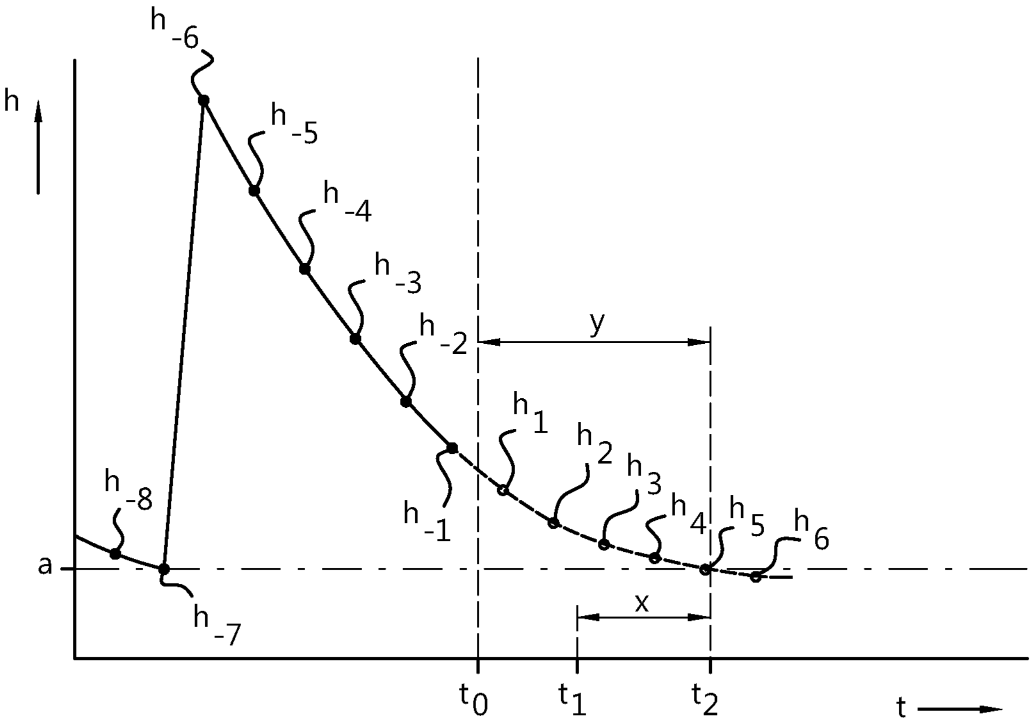
FIG. 3 shows a diagrammatic graph of measured and calculated feed-quantity values over time.

In this case, each group of feed-quantity values ($h_{-n}$) is analyzed, as is illustrated in FIG. 3, which diagrammatically shows a course of amount of feed over time at one of the feed fences 31. The feed-quantity values $h_{-1}, h_{-2}, \ldots, h_{-n}$ measured at different measurement instants are illustrated by means of closed dots. The current time is denoted by to. The feed-quantity values $h_{-1}, h_{-2}, \ldots, h_{-n}$, which are situated to the left of instant to in FIG. 3, were measured in the past and stored in the memory **35*a* of the control system 35. Based on these feed-quantity values $h_{-n}, h_{-2}, \ldots, h_{-n}$, which may, in practice, comprise for example two months, i.e. many more than the eight feed-quantity values $h_{-1}, h_{-2}, \ldots, h_{-8}$ shown in FIG. 3, the control system 35 calculates the feed-quantity values $h_1, h_2, \ldots, h_n$ after the last measurement instant, in this case in the future, using the self-learning algorithm 35*b***.

To this end, the control system 35 first calculates, for each group of feed-quantity values ($h_{-n}$), by means of a function fit ("curve fit"), a value for a parameter λ in an exponential function with $N \cdot e^{\lambda t}$, in which λ is representative of the rate of consumption, t is the time, and N is a constant, such as 100. This means that the feed-quantity values in each case assume an exponential course over time. In this case, each example with which the self-learning algorithm **35*b*** is fed comprises a feed-quantity value $h_{-n}$ at a measurement instant, a value which is representative of that measurement instant, and further time-dependent parameters as input, and an associated value for the parameter λ as output ("target"), which value is calculated using a function fit.

The self-learning algorithm **35*b* is then able to recognize correlations, i.e. statistical relations, between the input and the output. Based on the recognized correlations, the algorithm can then predict a value for the parameter λ, which forms a measure for the rate of consumption at the feed fence 31 at and/or after the last measurement instant, as output. In other words, if the last-measured feed-quantity value stored in the memory is presented as input to the algorithm in combination with an associated value which is representative of that last measurement instant and further time-dependent parameters, the self-learning algorithm 35*b* produces a value for the parameter λ as output. Thus, an exponential function $N \cdot e^{\lambda t}$ is fixed which runs through the last-measured feed-quantity value $h_{-n}$ stored in the memory. The control system 35** can then easily calculate the feed-quantity values $h_n$ at points in time after the last measurement instant on the basis of the predicted exponential function.

In this exemplary embodiment, the self-learning algorithm **35*b* therefore uses the last-measured feed-quantity value $h_{-1}$ stored in the memory 35*a* as a starting point for the prediction. This last-measured feed-quantity value $h_{-n}$ and the associated time-dependent parameters together form an input for the self-learning algorithm 35*b*. Based on this input, the self-learning algorithm 35*b*, after having been trained sufficiently by means of pattern recognition in the received examples, determines the value for the rate of consumption in the form of the parameter λ at the feed fence 31, at and/or after the last measurement instant, as output, i.e. a value which is representative of the rate at which the quantity of feed which is present at the feed fence 31 for consumption by the animals, decreases at that feed fence 31. By means of the calculated value for the rate of consumption, the control system 35 can then calculate the feed-quantity values $h_1, h_2, \ldots, h_n$ at points in time after the last measurement instant by means of this value for the rate of consumption. These calculated feed-quantity values $h_1, h_2, \ldots, h_n$ are indicated by open dots in FIG. 3. As a result thereof, the feeding system 1 takes into account variations in the rate of consumption, so that the feeding system 1 can deliver the subsequent batch of feed at the feed fence 31** (virtually) exactly at a desired time.

In this exemplary embodiment, the control system 35 assumes that the quantity of feed at the feed fence 31 exponentially decreases to an asymptotic value 0. In practice, the animals 9 do not finish the feed entirely, but a small quantity of residual feed remains at the feed fence 31 which is not, or hardly, eaten by the animals 9. In this exemplary embodiment, a threshold value a is chosen and set manually in the control system 35, for example by the farmer or a service technician, and corresponds to a residual feed quantity value which, in practice, occurs on the farm. The control system 35 determines when the predicted, future feed-quantity value at the feed fence 31 drops below this threshold value a. At the instant that the future feed-quantity value drops below the threshold value a, the feed fence 31 is effectively empty, i.e. the feed has finished, even if there is still a small quantity of residual feed present. That future depletion time or instant for the feed fence 31 is denoted by $t_2$ in FIG. 3.

The control system 35 determines a starting time $t_1$ to start loading a subsequent batch of feed into the container 12 of the feed wagon 10 by calculating back from that future depletion time $t_2$ by at least such a time interval x that the subsequent batch of feed is dispensed at the feed fence 31 by the feed wagon 10 before the animals 9 have substantially finished the feed at that feed fence 31. In other words, the control system 35 sends a start command to the feed-loading system 20 at the starting time $t_1$ to start loading the subsequent batch of feed into the feed wagon 10, so that there is sufficient time to load and mix the subsequent batch of feed in the container 12 of the feed wagon 10, drive to the feed fence 31 and dose out the feed before the feed at that feed fence 31 effectively finishes.

The time interval x may be chosen to be fixed for each feed fence 31 in the control system 35. The fixed time interval x is input, for example manually, into the control system 35 by a farmer or service technician, preferably based on experiences of the time period which is required from the start command to the feed-loading system 20 to start loading the subsequent batch of feed to the actual dosing out of the feed at the feed fence 31 by the feed wagon 10. However, the fixed time interval x may also be adjusted automatically by the control system 35. The fixed time interval x is, for example, between 30 minutes and 3 hours. In practice, such a time interval x is usually sufficient to prepare the subsequent batch of feed and take it to the feed fence 31 and dispense it there.

However, it is also possible for the time interval x to be variable. The control system 35 determines the time interval x, for example in dependence on the selected ration. The required time period for preparing the subsequent batch of feed depends on the selected ration. The control system 35 can request for each ration how long it takes to prepare the subsequent batch of feed according to that ration in the feed wagon 10. In addition, the time the feed wagon 10 requires to drive to the various feed fences 31 may vary. The control system 35 may determine a delivery time or travel time for driving a route to the various feed fences 31, and also make the time interval x dependent thereon.

After the control system 35 has given the start command to the feed-loading system 20 at the starting time $t_1$ to start loading the subsequent batch of feed according to the selected ration into the feed wagon 10, the feed wagon 10 is loaded with this subsequent batch of feed and the feed wagon 10 then drives autonomously to the one or more feed fences 31 with a feed requirement in order to dose out the feed for the animals 9.

In practice, a farm virtually always has a plurality of feed fences 31. When the feed at one of the feed fences 31 finishes, the feed wagon 10 will automatically add feed at that feed fence 31. In this case, the feed wagon 10 may drive a route along a plurality of feed fences 31, so that feed-quantity values are measured at this plurality of feed fences 31. Since the feeding system 1 according to the invention stores the measured feed-quantity values in the memory 35*a*, and the control system 35 determines the starting time $t_1$ to start preparing the subsequent batch of feed on the basis of an accurately predicted depletion time, it is hardly necessary, if at all, to make the feed wagon 10 drive just in order to collect feed-quantity values. If the feed wagon 10 only measures feed-quantity values when delivering feed or piling up feed, and in doing so drives a route along one or more of the feed fences 31, the control system 35 has sufficient feed-quantity values to accurately determine the starting time $t_1$.

Instead of or in addition to predicting the future depletion time $t_2$, i.e. the moment at which the feed at the feed fence 31 is effectively finished, the control system 35 can predict a depletion time duration y for the feed fence 31 (see FIG. 3). The depletion time duration y indicates how long it takes before the predicted, future feed-quantity value $h_n$ at the feed fence 31 drops below the preset threshold value a for the quantity of feed at that feed fence 31. The depletion time duration y may also be determined on the basis of the feed-quantity values $h_{-n}$ stored in the memory 35*a*, in particular by means of the rate of consumption at the feed fence 31 determined by the self-learning algorithm 35*b*. The control system 35 then calculates the starting time $t_1$ on the basis of this depletion time duration y for the feed fence 31. To this end, the control system 35 may directly compare the depletion time duration y for the feed fence 31 to the time interval x for preparing the subsequent batch of feed and delivering that feed. It is therefore not necessary to explicitly determine the future depletion time $t_2$ in the control system 35.

The invention is not limited to the exemplary embodiment illustrated in the figures. The person skilled in the art may make various modifications without departing from the scope of the invention. Instead of calculating the future feed-quantity values by means of a predicted rate of consumption, the self-learning algorithm may also directly predict the future feed-quantity values on the basis of the measured feed-quantity values stored in the memory. In other words, in this case the self-learning algorithm is fed examples which each comprise a feed-quantity value measured at a measurement instant in combination with associated values of time-dependent parameters as input, and a feed-quantity value measured after that measurement instant as output. After sufficient examples have been presented to the self-learning algorithm, the self-learning algorithm is able to predict one or more future feed-quantity values as output, based on the last-measured feed-quantity value and associated time-dependent parameters. In addition, the control system may be configured to calculate a value of a different feed variable than the feed-quantity value, such as a feed variable which is representative of a time period until a subsequent start command to start loading a subsequent batch of feed is desired. In this case, such a time period may be added in each case to each measured feed-quantity value stored in the memory. In other words, the control system may first convert the measured feed-quantity values to an associated time period until the next start command. Subsequently, the control system may calculate, on the basis of the converted values of this time period, one or more values for this time period at the or each feeding place at one or more points in time after the last measurement instant. In this case, the control system therefore does not have to predict feed-quantity values, but the control system can directly predict the time period until the next start command is desired. According to the invention, it is also possible for the control system to use the one or more calculated feed-quantity value or values of a different feed variable in a way other than to set the point in time at which feed from the subsequent batch of feed is delivered at the one or more feeding places. In addition thereto or instead thereof, the control system may, for example, send a message to a smartphone dependent on the calculated feed-quantity value (s).

The invention claimed is:

1. A feeding system for feeding animals at at least one feeding place, feed from a feed supply, wherein the feeding system comprises:

an autonomous feeding device comprising a container for accommodating a batch of feed from the feed supply, wherein the autonomous feeding device is configured to take feed held in the container to the feeding place and dispense the feed at the feeding place, a feed-quantity measuring device for repeatedly measuring a feed-quantity value ($h_{-n}$) for a quantity of feed which is available for consumption by the animals at the feeding place, and a control system which is configured to receive feed-quantity values ($h_{-n}$) from the feed-quantity measuring device measured at the feeding place at different measurement instants, wherein the control system is configured to perform the following:

store a plurality of feed-quantity values ($h_{-n}$) received from the feed-quantity measuring device in a memory, and calculate at least one value of a feed variable ($h_n$), which relates to a course of the feed-quantity values over time, at at least one point in time after a last measurement instant, based on the feed-quantity values ($h_{-n}$) stored in the memory.

2. The feeding system according to claim 1, wherein the value of the feed variable comprises a feed-quantity value ($h_{-n}$) for the quantity of feed which is available at the feeding place for consumption by the animals.

3. The feeding system according to claim 1, wherein the feeding system further comprises a feed-loading system for loading feed from the feed supply into the container of the autonomous feeding device, and wherein the control system is configured to control the feed-loading system and/or the autonomous feeding device to load a subsequent batch of feed and/or to take a loaded subsequent batch of feed to the feeding place, based on the calculated at least one value of the feed variable ($h_n$).

4. The feeding system according to claim 3, wherein the control system is configured to determine a starting time ($t_1$) to start loading a subsequent batch of feed and/or taking a loaded subsequent batch of feed to the feeding place, based on the calculated value of the feed variable ($h_n$).

5. The feeding system according to claim 4, wherein the control system is configured to send a start command to the feed-loading system at the starting time ($t_1$) to start loading the subsequent batch of feed, or to the autonomous feeding device to start taking a loaded batch of feed to the feeding place.

6. The feeding system according to claim 1, wherein the control system comprises a self-learning algorithm configured to receive the feed-quantity values ($h_{-n}$) stored in the memory, and wherein the control system is configured to calculate the value of the feed variable ($h_n$) at the point in time after the last measurement instant, using the self-learning algorithm.

7. The feeding system according to claim 6, wherein the self-learning algorithm is configured to determine at least one value which is representative of a rate of consumption at the feeding place at and/or after the last measurement instant with which the quantity of feed which is available for consumption by the animals decreases at the feeding place, on the basis of the feed-quantity values ($h_{-n}$) stored in the memory, and wherein the control system is configured to calculate the value of the feed variable ($h_n$) at the point in time after the last measurement instant on the basis of a last-measured feed-quantity value ($h_{-n}$) stored in the memory and said at least one value for which is representative of the rate of consumption.

8. The feeding system according to claim 7, wherein the self-learning algorithm is configured to receive examples, which each comprise a value which is representative of one of the measurement instants, a feed-quantity value ($h_{-n}$) at said measurement instant and an associated value for the rate of consumption, and wherein the self-learning algorithm is configured to determine the value for the rate of consumption at the feeding place at and/or after the last measurement instant, on the basis of the received examples.

9. The feeding system according to claim 8, wherein the control system is configured to divide the feed-quantity values ($h_{-n}$) stored in the memory into groups over time, which each starts with a feed-quantity value ($h_{-n}$) which is measured immediately after a delivery of feed, and wherein the control system is configured to calculate, for each of the groups of feed-quantity values ($h_{-n}$) a value for a parameter $\lambda$ in an exponential function with $e^{\lambda t}$, wherein $\lambda$ is representative of a rate of consumption and t is a time, and wherein the self-learning algorithm is configured to receive examples which each comprise a feed-quantity value ($h_{-n}$) at a measurement instant and an associated calculated value for the parameter $\lambda$, and wherein the self-learning algorithm is further configured to determine a value for the parameter $\lambda$ in an exponential function with $e^{\lambda t}$, which runs through a last-measured feed-quantity value ($h_{-n}$) stored in the memory, and wherein the control system is configured to calculate the value of the feed variable ($h_n$) at the point in time after the last measurement instant by means of said exponential function using the value for the parameter $\lambda$ determined by the self-learning algorithm.

10. The feeding system according to claim 4, wherein the control system is configured to determine a future depletion time ($t_2$) for the feeding place on the basis of the calculated value of the feed variable ($h_n$), and the control system is furthermore configured to determine the starting time ($t_1$) on the basis of said future depletion time ($t_2$).

11. The feeding system according to claim 10, wherein the control system is configured to determine the starting time ($t_1$) by calculating back from the future depletion time ($t_2$) at least by such a time interval (x), that the subsequent batch of feed is dispensed at the feeding place by the autonomous feeding device before the animals have substantially finished the feed at the feeding place.

12. The feeding system according to claim 11, wherein the time interval (x) for the feeding place is set in the control system as a fixed period.

13. The feeding system according to claim 11, wherein various rations are stored in the memory of the control system, and wherein the control system is configured to determine the time interval (x) on the basis of a selected ration which is used to load the subsequent batch of feed.

14. The feeding system according to claim 11, wherein the control system is configured to determine a delivery time for delivering feed held in the container to the feeding place by means of the autonomous feeding device, and wherein the control system is further configured to determine the time interval (x) on the basis of said delivery time.

15. The feeding system according to claim 1, wherein the feed-quantity measuring device is fitted to the autonomous feeding device, and wherein the feed-quantity measuring device is configured to measure the feed-quantity value ($h_{-n}$) at the feeding place when the autonomous feeding device moves past the feeding place.

16. A method for automatically feeding animals by means of the feeding system according to claim 1, wherein the method comprises:

repeatedly measuring the feed-quantity value ($h_{-n}$) for the quantity of feed which is present for consumption by the animals at the feeding place, storing a plurality of feed-quantity values ($h_{-n}$) measured at the feeding place at different measurement instants in the memory of the control system and calculating at least one value of a feed variable ($h_n$), which relates to the course of the feed-quantity values over time, at at least a point in time after the last measurement instant on the basis of the feed-quantity values ($h_{-n}$) stored in the memory.

17. The feeding system according to claim 1, wherein the feeding animals are cows.

18. The feeding system according to claim 16, wherein the feeding animals are cows.

* * * * *